June 24, 1930.  A. ENGLAND  1,765,575
HOSE COUPLING GAUGE
Filed Oct. 18, 1928
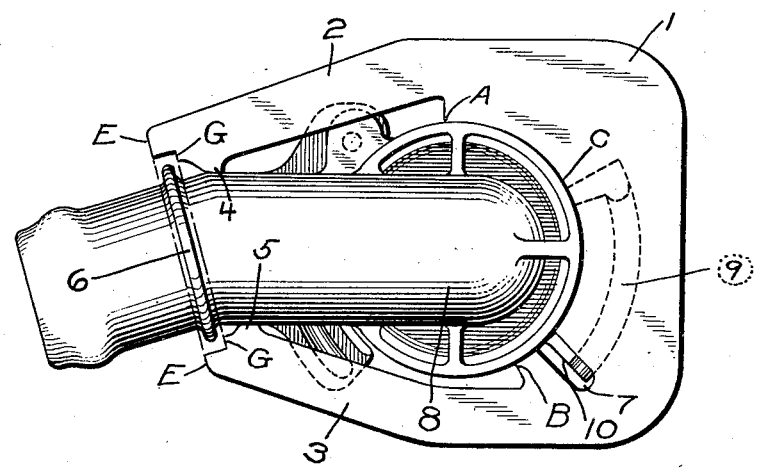
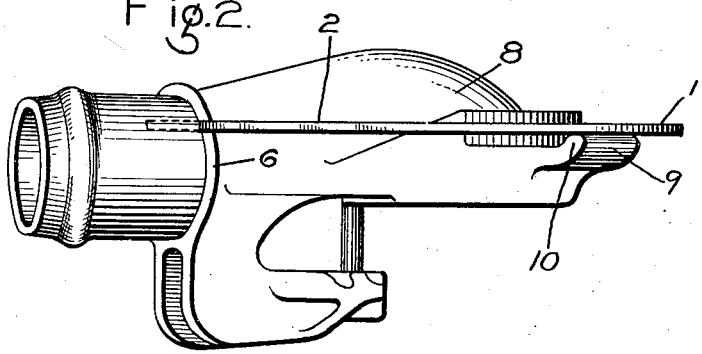
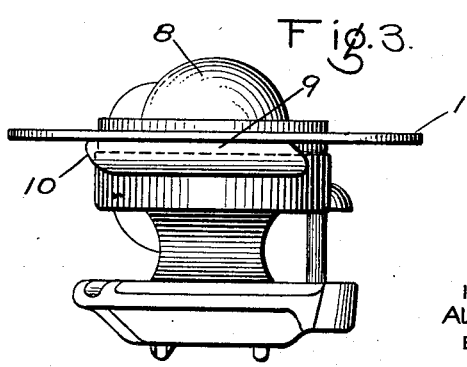
INVENTOR
ALEXANDER ENGLAND
BY
ATTORNEY Patented June 24, 1930

1,765,575

UNITED STATES PATENT OFFICE

ALEXANDER ENGLAND, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA

HOSE-COUPLING GAUGE

Application filed October 18, 1928. Serial No. 313,225.

This invention relates to test gauges, and more particularly to a test gauge for hand operated hose couplings.

The principal object of the invention is to provide a test gauge for hose coupling heads to determine whether the position of the end shoulder of the locking flange is within predetermined limits, whether the finished surface adjacent the locking flange equals or exceeds a minimum length, and whether the annular rib at the hose end of the coupling is spaced within predetermined limits.

In the accompanying drawing; Fig. 1 is a plan view of a hand operated hose coupling head, showing my improved gauge applied thereto; Fig. 2 is a side elevational view of the coupling head with the gauge applied; and Fig. 3 an end view thereof.

As shown in the drawing, the gauge comprises a plate 1 having the central portion cut away to provide a finished circular edge extending from the point A to the point B, the portion cut away also providing arms 2 and 3. Near the outer ends, the arms 2 and 3 are provided with inwardly extended rounded contact portions 4 and 5, adapted to engage the sides of the coupling head 1. Beyond the portions 4 and 5, the arms 2 and 3 are provided with transverse faces E and G, spaced apart to provide a limit test for the usual annular rib 6 of the coupling head.

The plate is also provided with a slot 7 extending radially from the surface A—B—C.

In operation, the gauge is applied to the hose coupling head 8, so that the finished circular edge A—B—C engages the finished surface of the coupling head which is always provided adjacent to the locking flange 9 and with the portions 4 and 5 engaging the body of the coupling head, as shown in Fig. 1.

If the coupling head is acceptable, the end shoulder 10 of the locking flange 9 must fall within the edges of the slot 7. The finished face of the coupling head adjacent to the locking flange 9 must have a minimum length from the point A to the point B.

The rib 6 must fall between lines extended from the faces E and G, such lines being shown as dotted lines in Fig. 1.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A gauge for testing a hose coupling head having a locking flange comprising a plate having a portion cut away to provide an arcuate edge adapted to engage a circular machined surface adjacent the locking flange of the coupling head and having arms provided with portions engaging the body of the coupling head, the gauge being provided with a radial slot, so positioned as to visually indicate the relative position of the end of the locking flange of the coupling head.

2. A gauge for testing a hose coupling head having a locking flange comprising a plate having a portion cut away to provide an arcuate edge adapted to engage a circular machined surface adjacent the locking flange of the coupling head and having arms provided with portions engaging the body of the coupling head, the extent of the circular machined surface being indicated by the predetermined extent of the arcuate edge of the gauge.

3. A gauge for testing the extent of the circular machined surface of a hose coupling head adjacent to the locking flange comprising a plate having a portion cut away to provide an arcuate edge of predetermined angular extent and adapted to engage said machined surface, and means on the gauge for positioning the gauge on the coupling head.

4. A gauge for testing the position of the end of the locking flange of a hose coupling head comprising a plate having means for positioning the plate on the hose coupling head and provided with a slot so disposed that the locking flange may be viewed therethrough, so that if the end of the locking flange does not show in the slot, it will indicate that the end of the locking flange is not within the desired limits.

5. A gauge for testing the relative position of the end of the locking flange of a hose coupling head and also the angular extent of the machined surface adjacent to the locking flange comprising a plate having a cut away portion providing an arcuate edge adapted to engage said machined surface and a radial slot through which the end of the locking flange may be viewed, and means for positioning said gauge on the comprising head.

In testimony whereof I have hereunto set my hand, this 15th day of October, 1928.

ALEXANDER ENGLAND.